United States Patent [19]

Westerfer et al.

[11] Patent Number: 5,146,496
[45] Date of Patent: Sep. 8, 1992

[54] METHOD AND APPARATUS FOR ENHANCING THE SECURITY OF A SCRAMBLED TELEVISION SIGNAL

[75] Inventors: Richard Westerfer, Blue Bell; Clyde Robbins, Maple Glen, both of Pa.; Anthony M. Radice, Riverside, N.J.

[73] Assignee: General Instrument Corporation, Hatboro, Pa.

[21] Appl. No.: 714,673

[22] Filed: Jun. 13, 1991

[51] Int. Cl.$^5$ ............................................. H04N 7/16
[52] U.S. Cl. ............................................. 380/15; 380/11
[58] Field of Search .............................. 380/11, 14, 15

[56] References Cited

U.S. PATENT DOCUMENTS

| | | | |
|---|---|---|---|
| 3,813,482 | 5/1974 | Blonder | 380/15 |
| 4,095,258 | 6/1978 | Sperber | 380/15 |
| 4,163,252 | 7/1979 | Mistry et al. | 380/15 |
| 4,542,407 | 9/1984 | Cooper et al. | 380/15 |
| 4,571,615 | 2/1986 | Robbins et al. | 380/15 |
| 4,901,349 | 2/1990 | Metzger et al. | 380/11 |
| 5,034,981 | 7/1991 | Leonard et al. | 380/15 |
| 5,060,262 | 10/1991 | Bevins, Jr. et al. | 380/15 |

OTHER PUBLICATIONS

Rudolf F. Graf and William Sheets, "Universal Descrambler", *Radio-Electronics*, May 1990, pp. 37-43.

Primary Examiner—Salvatore Cangialosi
Attorney, Agent, or Firm—Barry R. Lipsitz

[57] ABSTRACT

The scrambling security of a sync suppressed television signal is enhanced by eliminating the fixed time relationship between the normal color burst component and synchronization information in successive lines of the television signal. Transmission of a first plurality of television lines is delayed to achieve a cumulative delay corresponding at least to the duration of a color burst component of the television signal. The transmission of a second plurality of television lines is subsequently accelerated to reduce the cumulative delay. By repeating the delaying and accelerating steps, the location of the color burst component is varied within the television signal over time. Derivation of a substitute horizontal synchronization pulse from the color burst component is thereby prevented.

20 Claims, 1 Drawing Sheet

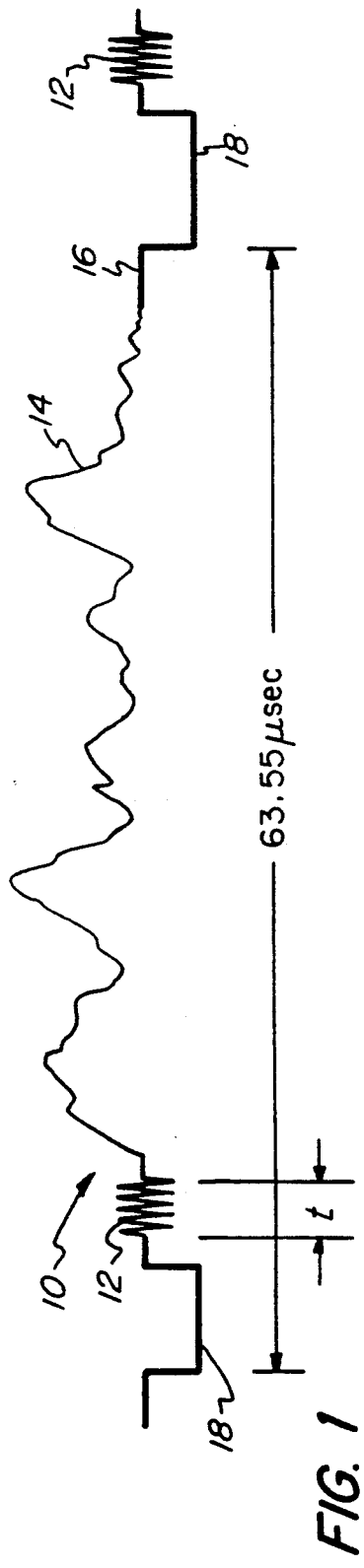
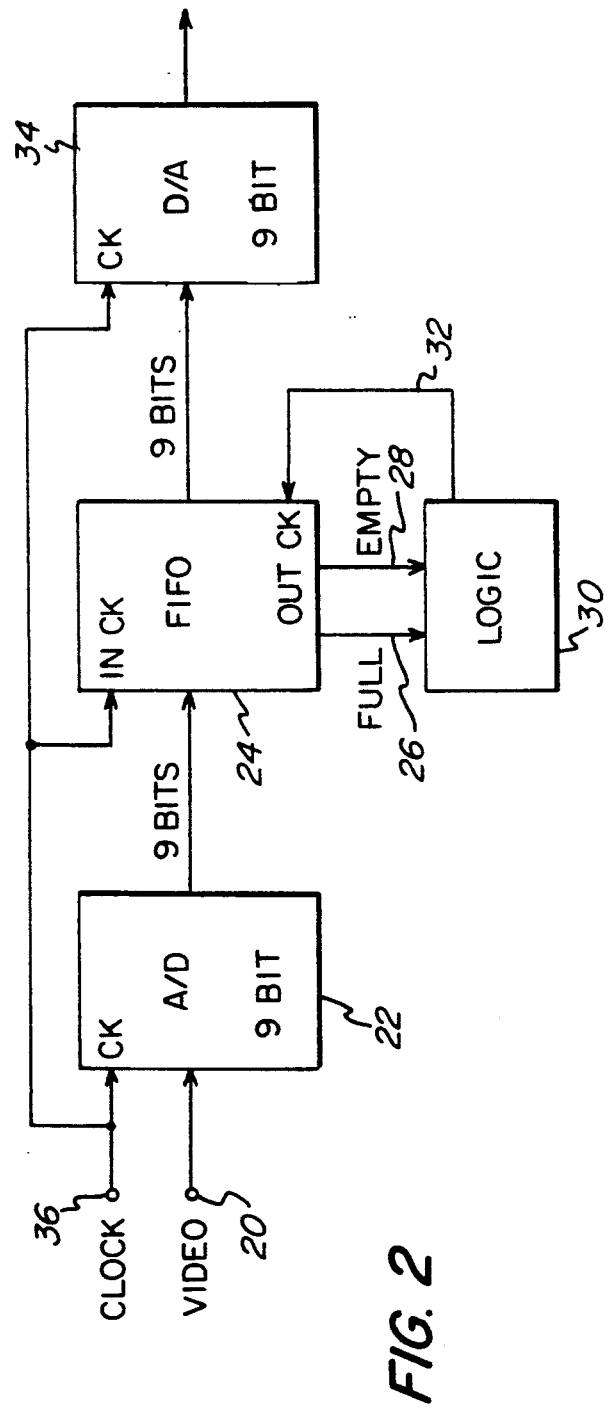

METHOD AND APPARATUS FOR ENHANCING THE SECURITY OF A SCRAMBLED TELEVISION SIGNAL

BACKGROUND OF THE INVENTION

The present invention relates to the distribution of television programs, and more specifically to an improved scrambling scheme for preventing the unauthorized reception of television programs that are scrambled by the suppression of synchronization information.

Techniques for scrambling the video portions of television signals are well known. For example, U.S. Pat. No. 3,813,482 to Blonder discloses a system for transmitting television signals wherein the video is scrambled by suppressing vertical or horizontal synchronization pulses to produce a shifting or rolling scrambled picture. In U.S. Pat. No. 4,542,407 to Cooper, et al, apparatus is disclosed for scrambling and descrambling television programs in which the horizontal synchronizing information is suppressed at a cable television headend, and then regenerated by a subscriber's cable television converter. U.S. Pat. Nos. 4,095,258 to Sperber, 4,163,252 to Mistry, et al, and 4,571,615 to Robbins, et al describe apparatus for decoding scrambled television signals.

The economic viability of subscription television programming, including cable television and satellite television services, is dependent on the ability of the transmitter to encode or scramble a television signal so that an unauthorized receiver will not be able to receive a viewable television picture. As indicated in the patents cited above, a common technique that has been employed to scramble video signals is to suppress the horizontal synchronization pulses below the average value of the video level. This causes the television receiver to unsuccessfully attempt to lock horizontally on random video peaks rather than on the horizontal synchronization pulses. The loss of effective horizontal synchronization prevents the receiver from properly utilizing the color burst signal associated with the horizontal synchronization pulse, so that color reproduction is also faulty.

In order for a receiver to be able to view the scrambled video signal, the suppressed synchronization pulses must be restored. Two techniques are commonly employed to allow the receiver to recover the suppressed sync and timing information. In one technique, a timing pulse is amplitude modulated on the FM audio carrier of the television signal, which is then detected in the audio portion of the receiver and used to generate the timing signals necessary to descramble the received video signal In another known technique, some portion of the sync timing pulses, such as during the vertical interval, is transmitted without suppression, i.e., "in the clear". The receiver phase locks to the clear or unsuppressed sync portion to create the required synchronizing and timing information for descrambling the video portions of the signal.

Neither of these known techniques are immune to unauthorized recovery by "pirate" descramblers. Such descramblers are known that will restore usable synchronization to virtually all known prior art sync suppressed video signals. Such devices typically use the color burst component of the video signal as a "key" to recover all other necessary sync and timing information.

All NTSC (National Television Systems Committee) video signals contain a color burst component at 3.58 MHz. The horizontal frequency of the video signal is related to the burst by a factor of 227.5. Therefore, by extracting the 3.58 MHz color burst components from a received scrambled video signal, a horizontal synchronization pulse can be generated and inserted into the video signal where the original pulse has been removed or suppressed. A television receiver can then lock on to the new sync pulse so that video information can be viewed.

It would be advantageous to provide a system for scrambling the video portion of television signals that would preclude the use of color subcarrier information for regenerating synchronization and timing information. Such a system should not interfere with the descrambling of scrambled signals by the millions of authorized descramblers already installed in the field. The present invention provides such a system.

SUMMARY OF THE INVENTION

In accordance with the present invention, a method is provided for enhancing the scrambling security of a television signal that is scrambled by the suppression of synchronization information. The transmission of each line in a first set of television lines in a scrambled television signal is individually delayed to achieve a cumulative delay corresponding at least to the duration of a color burst component of the television signal. The transmission of each line in a second set of television lines in the television signal is subsequently accelerated to reduce the cumulative delay. By repeating the delaying and accelerating steps, the location of the color burst component and other television information within the television signal is varied over time. However, the phase relationships between the color burst and the video information within each line remains constant.

In an illustrated embodiment, the transmission delay is effected by adding a time increment to a selected line in each field of a first set of fields of the television signal. The transmission acceleration is provided by deleting a time increment from a selected line in each field of a second set of fields of the television signal. Preferably, the time increments are added and deleted during non-video portions of the television signal, such as during the vertical blanking intervals. In this manner, no video information is lost when the transmission of signal lines is accelerated.

In a specific implementation of the invention, the time increments that are added and deleted from selected horizontal television lines are equal in time to one cycle of a color burst subcarrier containing the color burst component. The color burst subcarrier has a frequency of about 3.58 MHz and the color burst component has a duration of no more than about 2.8 microseconds. This results in a time increment of about 280 nanoseconds (1/3.58 MHz) that achieves the cumulative delay after being added to no more than 10 lines of a conventional NTSC television signal.

Apparatus for implementing the present invention includes means for providing a scrambled television signal containing successive lines of video information. First means are coupled to the providing means for adding a time increment to at least one line of the scrambled television signal to achieve a delay corresponding at least to the width of a color burst component of the television signal. Second means, coupled to the providing means, delete a time increment from at least one other line of the television signal to reduce said delay. By alternately adding and deleting time from television signal lines, the color burst component is caused to drift over time, rendering it unacceptable for use as a timing reference.

In a preferred embodiment, the first means add time to a selected line in each of a first set of fields of the television signal, to effect a cumulative delay corresponding to at least the width of the color burst component. The second means delete time from a selected line in each field of a second set of fields of the television signal to reduce the cumulative delay. The time increments are preferably added and deleted during vertical blanking intervals of the television signal. In a specific embodiment, the time increments are equal in time to one cycle of a 3.58 MHz color burst subcarrier containing the color burst component. This establishes a time increment of about 280 nanoseconds, that achieves said cumulative delay after being added to no more than ten lines of the television signal when the color burst component has a duration of no more than about 2.8 microseconds.

In the illustrated embodiment, the delay and acceleration of the video signal occurs in the digital domain. The scrambled video signal is digitized to provide successive lines of digital video information corresponding to the horizontal lines of a television picture. Digital video information is buffered in an asynchronous first-in-first-out register ("FIFO") responsive to a first clock for inputting data thereto and responsive to a second clock for outputting data therefrom. In order to delay the transmission of a selected line of video information, the second clock is temporarily terminated to stop the output of data from the register. This adds time to a line of digital video information latched at an output of the register. In order to accelerate the transmission of selected video lines, additional output pulses are provided from the second clock for use in outputting data bits from the register at a high rate. The data bits output from the register in response to the additional output pulses are ignored.

BRIEF DESCRIPTION OF THE DRAWINGS

FIG. 1 is a timing diagram illustrating a horizontal line of video information; and FIG. 2 is a block diagram of a circuit for adding or deleting time increments to horizontal television lines in accordance with the present invention.

DETAILED DESCRIPTION OF THE INVENTION

In conventional sync suppression scrambling systems for NTSC color television signals, color burst information is provided at a fixed location within each video information line. Illegal decoder boxes utilize this fact to detect the color burst component and derive horizontal synchronization information therefrom. As long as the color burst is found within a window defined by normal signal tolerances, the decoder boxes are able to lock onto it and provide usable synchronization signals.

The present invention destroys the normal timing relationship between the color burst and horizontal synchronization pulse in a scrambled television signal. This is accomplished by adding time to selected video lines during vertical blanking intervals, such that a cumulative delay is provided which moves the color burst component outside of its normal window Time can then be deleted from selected lines, such that the color burst is brought back into the window By repeating the process on an ongoing basis, the location of the color burst in the television signal can be varied to preclude descrambling using synchronization pulses derived from the color burst.

In order to enable color television signals to be accurately processed by conventional, authorized descramblers, the normal 180° line-to-line phase shift of the color reference signal must be maintained. In order to accomplish this, the amount of time added to an individual video line in accordance with the present invention is equivalent to an integer multiple of a full cycle of the color burst subcarrier. Thus, where a conventional 3.58 MHz color burst subcarrier is used, time is added or deleted from individual video lines in 280 nanosecond (1/3.58 MHz) increments.

A video line, generally designated 10, of a conventional NTSC television signal is illustrated in FIG. 1. As shown, the video line has a duration of 63.55 microseconds, which is established by the horizontal synchronization frequency of 15.734 kHz. A horizontal blanking interval normally contains a horizontal synchronization pulse 18, which is suppressed or absent entirely in a scrambled signal that relies on horizontal sync suppression for video scrambling.

The horizontal synchronization pulse 18 is followed by a color burst signal 12 having a duration t, that is typically 2.25 to 2.8 microseconds. The video information 14 follows the color burst signal. The "front porch" 16 of the following horizontal blanking interval follows the video information 14. In accordance with the present invention, time is added to or deleted from the front porch 16 in order to vary the time between successive color burst components 12. The cumulative effect of adding time to the front porch in a plurality of video lines is to move the color burst component out of a window from which it can be recovered by illegal descramblers. Once the color burst subcarrier reference is moved outside of the recovery window, such illegal descramblers will free run off of their internal oscillators, precluding proper horizontal lockup.

In accordance with the present invention, time is added to one line of each field in a set of fields comprising a television picture. Preferably, time is added to a selected line during the vertical blanking interval in each of a plurality of consecutive fields so that the color burst subcarrier reference is moved outside of the recovery window as quickly as possible. Thus, for example, where 280 nanosecond time increments are added to a selected line in ten consecutive fields, the color burst component (which has a duration of no more than about 2.8 microseconds) will be shifted by at least its full width. This will preclude the use of the color burst component as a timing reference by a descrambler that searches for the component in its normal position within a video line.

By adding and deleting time increments on the front porch 16, the relationship between the horizontal sync pulse 18 and the color burst component 12 will remain constant within each line. The line-to-line relationships, however, will vary. The time increments that are added or deleted are limited to integer multiples of a color burst subcarrier cycle, to preserve the phase relationships necessary to properly recover the color information. Once the cumulative amount of time added to the selected line in a plurality of fields adds up to the width of color burst 12, any pirate decoder attempting to lock onto the color burst will not find the color burst in its normal location. As a result, the pirate decoder will begin to free run off of its internal oscillator, preventing it from descrambling the television signal.

FIG. 2 is a block diagram illustrating a specific implementation of circuitry for adding and deleting time from selected lines of a scrambled television signal. A conventional sync suppressed scrambled video signal is input at a terminal 20. A 9 bit analog-to-digital converter 22 converts the scrambled video signal to a digital format for processing. The digitized scrambled video signal is input from analog-to-digital converter 22 to a first-in-first-out register 24. FIFO 24 is an asynchronous device that inputs data at a first rate determined by an input clock and outputs data at a second rate determined by an output clock. The input clock signal is received via a terminal 36 that also supplies the clock to A/D converter 22 and a digital-to-analog converter 34. The FIFO output clock is controlled, in accordance with the present invention, by logic 30 that adds time to a particular line, in response to a conventional line counter, by stopping the output clock for the desired time increment. Logic 30 deletes time from a selected video line by adding additional clock pulses, thereby increasing the rate of the output clock above the rate of the input clock.

FIFO 24 stores the digital data received from A/D converter 22 until it is clocked out by the output clock. For purposes of the present invention, FIFO 24 can be, for example, a conventional 1 K×9 bit device that includes an "almost full" and an "almost empty" flag output. The almost full flag on line 26 and almost empty flag on line 28 are used by logic 30 to determine when to start emptying the FIFO by deleting time from video lines and when to start filling the FIFO by adding time to video lines, respectively.

Upon commencement of the circuit's operation, logic 30 stops the output clock as data arrives from A/D converter 22 to fill FIFO 24 to approximately one-half its capacity. Then, logic 30 produces an output clock on line 32 to clock data from the FIFO to digital-to-analog converter 34 at the same rate the data is clocked into the FIFO by the input clock received at terminal 36. A line counter included in logic 30 determines when a selected line of a given field has been reached in the incoming video data. At this point, logic 30 terminates the output clock on line 32 to add time to the front porch 16 of the selected line. When the desired time increment (e.g., 280 nanoseconds) has been added to the front porch 16 of the selected line, logic 30 resumes the output clock at the same frequency as the input clock. Consequently, D/A converter 34 will receive the subsequent data delayed by the cumulative delay of all the time increments added to selected lines of preceding fields. Upon the receipt of data from FIFO 24, D/A converter 34 converts it back to an analog format for transmission to subscriber terminals in a conventional manner.

Once the cumulative delay is such that the FIFO almost full flag turns on, logic 30 will respond by starting to delete time from selected subsequent lines of the video signal. In particular, logic 30 will add at least one extra clock pulse during the front porch 16 of the selected line in each field, thereby causing FIFO 24 to output a portion of the front porch data at a time when D/A converter 34 is not in a position to accept the data. Accordingly, this data is effectively discarded, and time is deleted from the video line. Once the cumulative acceleration of data output from FIFO 24 in this manner almost empties the FIFO, the almost empty flag will turn on to signal logic 30 to commence adding time to subsequent video lines The process of adding and deleting time will continue repeatedly, to continuously vary the location of the color burst component within the television signal over time. Although the other portions of the video signal will also vary over time, the relationship between the color burst 12 and synchronization information 18 will remain constant within each line.

The extent to which video lines are delayed or accelerated depends only on the memory capacity of FIFO 24. The system will achieve its objective of moving the color burst out of the locking range of a pirate decoder as long as FIFO 24 is large enough to cause a cumulative time shift that is equal to or greater than "t" illustrated in FIG. 1. For all practical purposes, this will always be the case since commercially available FIFOs store much more data than the small amount required to achieve the minimum time shift t.

Attention must be paid to the line that is selected in each field for adding or deleting time. For example, certain implementations, such as closed caption television, insert data on the front porch of a video signal that must not be corrupted. It is therefore preferable to add and delete the time increments during the vertical blanking intervals of the scrambled television signal.

It should now be appreciated that the present invention provides a scheme for eliminating the fixed time relationship between the color burst and horizontal synchronization information in successive lines of a television signal. The scheme is useful for preventing illegal descramblers from locking onto the color burst component to derive the synchronization information necessary to descramble a sync suppressed scrambled television signal.

Although the invention has been described in connection with a specific embodiment thereof, those skilled in the art will appreciate that numerous adaptations and modifications may be made thereto without departing from the spirit and scope of the invention, as set forth in the claims.

What is claimed is:

1. A method for enhancing the scrambling security of a television signal that is scrambled by the suppression of synchronization information, comprising the step of:
varying the position of a color burst component with respect to suppressed synchronization information in different video lines of the television signal, while maintaining a fixed phase relationship between successive color burst components in successive active video lines.

2. A method in accordance with claim 1 wherein said position is varied by the steps of:
adding a time increment to a selected line in each field of a first set of fields of the television signal to achieve a cumulative delay corresponding at least to the duration of said color burst component; and
deleting a time increment from a selected line in each field of a second set of fields of the television signal to reduce said delay.

3. A method in accordance with claim 2 wherein said time increments are added and deleted during vertical blanking intervals of said television signal.

4. A method in accordance with claim 2 wherein said time increments are equal in time to one cycle of a color burst subcarrier containing said color burst component.

5. A method in accordance with claim 4 wherein said time increments are added and deleted during vertical blanking intervals of said television signal.

6. A method in accordance with claim 4 wherein said color burst subcarrier has a frequency of about 3.58 MHz and said color burst component has a duration of no more than about 2.80 μsec, resulting in a time increment of about 280 nanoseconds that achieves said cumulative delay after being added to no more than ten lines of said television signal.

7. A method in accordance with claim 2 comprising the step of repeating said adding and deleting steps to vary the location of said color burst component within said television signal on an ongoing basis.

8. Apparatus for enhancing the scrambling security of a television signal that is scrambled by the suppression of synchronization information, comprising:
   means for providing a scrambled television signal containing successive lines of video information;
   first means coupled to said providing means for adding a time increment to at least one line of said scrambled television signal to achieve a cumulative delay corresponding at least to the width of a color burst component of the television signal, said time increment having a duration calculated to maintain a fixed phase relationship between successive color burst components in active video lines of said television signal; and
   second means coupled to said providing means for deleting a time increment from at least one other line of said television signal to reduce said delay while maintaining said fixed phase relationship;
   wherein said color burst component is caused to drift over time without corrupting the color content of said television signal, while rending it unacceptable for use as a timing reference.

9. Apparatus in accordance with claim 8 wherein said first means add time to a selected line in each of a first set of fields of said television signal, to effect a cumulative delay corresponding to at least the width of said color burst component.

10. Apparatus in accordance with claim 9 wherein:
said second means delete time from a selected line in each field of a second set of fields of the television signal to reduce said cumulative delay.

11. Apparatus in accordance with claim 10 wherein said time increments are added and deleted during vertical blanking intervals of the television signal.

12. Apparatus in accordance with claim 10 wherein said time increments are equal in time to one cycle of a color burst subcarrier containing said color burst component.

13. Apparatus in accordance with claim 12 wherein said color burst subcarrier has a frequency of about 3.58 MHz and said color burst component has a duration of no more than about 2.80 μsec, resulting in a time increment of about 280 nanoseconds that achieves said cumulative delay after being added to no more than ten lines of said television signal.

14. Apparatus in accordance with claim 8 wherein said first and second means vary the location of said color burst component over time on an ongoing basis during the transmission of said television signal.

15. Apparatus for enhancing the scrambling security of a television signal that is scrambled by the suppression of synchronization information, comprising:
   means for digitizing a scrambled video signal to provide successive lines of digital video information corresponding to the lines of a television picture;
   means coupled to an output of said digitizing means for buffering said digital video information;
   means operatively associated with said buffering means for delaying at least one line of digital video information to achieve a cumulative delay corresponding at least to the width of a color burst component of the television signal while maintaining a fixed phase relationship between successive color burst components in active video lines of said television signal; and
   means operatively associated with said buffering means for accelerating the transmission of at least one other line of digital video information to reduce said delay while maintaining said fixed phase relationship;
   wherein said color burst component is caused to drift over time without corrupting the color content of said television signal while rendering it unacceptable for use by a receiver as a timing reference.

16. Apparatus in accordance with claim 15 wherein:
said delaying means add time during a vertical blanking interval of said scrambled video signal; and
said accelerating means delete time during another vertical blanking interval of said scrambled video signal 17. Apparatus in accordance with claim 15 wherein:
said delaying means add time to a selected line in each field of a first set of fields of said scrambled video signal to effect a cumulative delay corresponding to at least the width of said color burst component; and
said accelerating means delete time from a selected line in each field of a second set of fields of the scrambled video signal to reduce said cumulative delay.

18. Apparatus in accordance with claim 15 wherein said buffering means comprise an asynchronous first-in-first-out register responsive to a first clock for inputting data thereto and responsive to a second clock for outputting data therefrom.

19. Apparatus in accordance with claim 18 wherein:
said delaying means comprise means operatively associated with said second clock for temporarily terminating the output of data from said register, thereby adding time to a line of digital video information latched at an output of said register; and
said accelerating means comprise means operatively associated with said second clock for providing additional output clock pulses to discard a portion of a digital video information line from the output of said register.

20. Apparatus in accordance with claim 19 wherein:
said delaying means add time to a selected line in each field of a first set of fields of said scrambled video signal to effect a cumulative delay corresponding to at least the width of said color burst component; and
said accelerating means delete time from a selected line in each field of a second set of fields of the scrambled video signal to reduce said cumulative delay.

* * * * *